March 11, 1930.  P. A. RICHARD  1,750,358
COLOR PHOTOGRAPHY
Filed Nov. 18, 1926
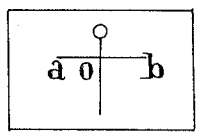
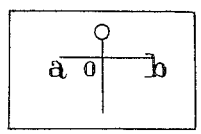
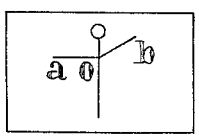
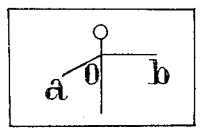
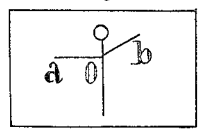
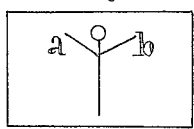
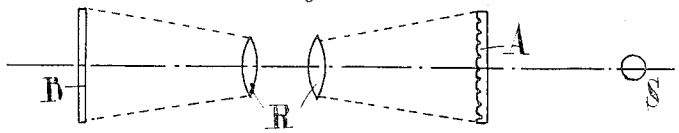
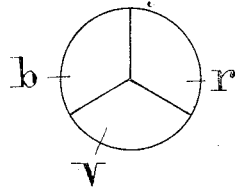
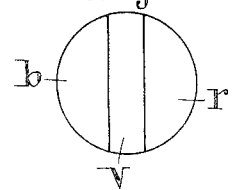
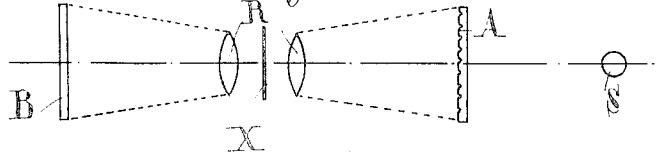
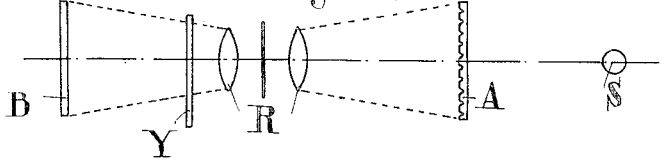
Inventor:
Pierre Abel Richard
By
Attorney Patented Mar. 11, 1930

1,750,358

UNITED STATES PATENT OFFICE

PIERRE ABEL RICHARD, OF PARIS, FRANCE, ASSIGNOR TO LA SOCIÉTÉ DU FILM EN COULEURS KELLER-DORIAN, OF PARIS, FRANCE

COLOR PHOTOGRAPHY

Application filed November 18, 1926, Serial No. 149,166, and in France December 19, 1925.

In color cinematography, the principal methods operate in two ways:

1. Picture-taking is effected with three objectives, each having a colored filter, one red, another green, and the third blue; the film advances for each group of three images, so that groups of three images taken at the same time are thus obtained, representing three selected monochrome images.

This method of procedure has the inherent defect that in picture-taking with three objectives, each object to be photographed is viewed from three different points. Hence, when the three monochrome images are projected on the screen in the form of a single image, they cannot be superposed perfectly because they were taken at three different angles, and parallax will occur.

2. Picture-taking is effected with a single objective, in front of which are successively passed a red filter, a green filter and a blue filter, thus producing three monochrome images which, however, were not taken at the same time. It follows, therefore, that the movements registered will not be superposable for the three colors.

I have ascertained that in certain cases it is important, in projection, to make use of the same projection system as used in the above processes, but necessarily omitting all the defects specified. These defects will be overcome if the three monochrome images are taken at the same time with a single objective as a single image, like the image of the Keller-Dorian color process (using goffered film), which is constituted by the juxtaposition of three monochrome images. Hence, I start out, in the first place, by using goffered film for the picture-taking.

In the accompanying drawing:

Figures 1 to 6 are diagrams explanatory, to some extent, of the theory of cinematography in colors in relation to the formation of parallactic images in projection;

Fig. 7 is a diagrammatic view of an apparatus in which the color-selecting filter is not included in the optical system or device;

Figs. 8 and 9 are diagrams of two forms of filters which may be used;

Fig. 10 shows the apparatus of Fig. 7 with a filter interposed in the diaphragm of the objective; and Fig. 11 is a modification or development of Fig. 10.

Referring to Figs. 1—6, Fig. 1 represents, by way of example, a subject to be photographed having two swinging arms $aO$ and $Ob$ capable of an angular movement of 180°; in Fig. 2, the subject is supposed to be stationary, whereas in Fig. 3 it is assumed to be in motion. In either event, and in the case of trichrome photography, three separate images, each of a different color of the selecting filter, must be obtained; and if these images are identical, they will exactly superpose on the screen, and the final or composite image will be entirely free from parallactic fringes. On the other hand, if the three monochrome images are not identical, as indicated in Figs. 4, 5 and 6, then they cannot be exactly superposed and the final colored images will have parallactic fringes. In the figures last named, E indicates the image taken through the blue filter, F that taken through the green filter, and G the one taken through the red filter.

Fig. 7 represents, diagrammatically, an arrangement in which a goffered film A of the Keller-Dorian type is illuminated by means of a suitable light source S; a symmetrical optical system R being interposed between the goffered film A and a non-goffered film B. The aforesaid Keller-Dorian film, as is well known, is provided with a multitude of tiny lenticular projections or elements on its front face, and carries on its rear face a layer of sensitized emulsion.

The color filter, which is located at the optical center of the system R, and is indicated at X in Fig. 10, is illustrated in Figs. 8 and 9 which show two different forms of the trichrome type. In both instances, the filter comprises different distinct portions $b$, $v$ and $r$ which are respectively colored blue, green and red; and in Fig. 8 these portions have the form of equal sectors, whereas in Fig. 9 they are formed as segments or bands.

The theory on which color photography on goffered film is based, is that the respective part of the emulsion behind each microscopic lenticular element of the goffered film receives the image of the trichrome filter arranged in the diaphragm of the objective; stated otherwise, the photographic image is distributed over as many minute zones as there are lenticular elements, and each of these tiny zones is itself divided into as many zones as there are colors in the filter in the diaphragm of the objective. Consequently, there will be found, on an image of this film, three monochrome images, clearly distinct but intimately united or blended by means of the lenticular elements, taken by a single objective and at the same moment. Owing to this special feature, which has been obtained by one and the same objective, the objectionable parallax which is present in other processes involving separated monochrome images is completely eliminated.

It is a question, now, of utilizing the image obtained on the goffered film and of recovering the three monochrome images which it contains by reproducing them individually as separate images in accordance with the projecting systems of other processes. To obtain this result, it is possible to operate in two ways. There is no need to specify whether the goffered film bearing the image is a negative or a positive, as both can be used. If it is a positive, the film bearing the separate monochrome images which is obtained will, quite naturally, be a negative, and from this negative copies can be made. On the other hand, if the film in question is a negative, positive monochrome images will be obtained directly.

The two methods of operation involve:
1. Reproduction on panchromatic film;
2. Reproduction on ordinary film.

As regards the former, Fig. 10 shows diagrammatically how the reproduction of the image taken on goffered film is effected on non-goffered film in a manner to obtain the desired separate monochrome images. In the case of trichrome images, for example, it must be understood that film B will be advanced three images at a time, while film A is advancing only one step. To obtain the separation of the three monochrome images, which are intimately blended or united in film A, there is placed in the diaphragm of the optical system R a filter X similar to the one previously used in taking the pictures. Projection in monochrome on film B then requires that the aforesaid filter be masked in such a way as to permit the light to pass through only one of its colored elements for each image on film B, which can be done in two ways: (a) by means of a suitable mechanical device which masks a colored part or parts of the filter; and (b) by means of an optical device. In fact, the same result is obtained if there are arranged in the path of the beam and even outside the optical system monochrome filters Y (Fig. 11) of the same colors as the filter X disposed in the system R. Taking, for example a blue-green-red trichrome filter X, and a blue filter Y, the blue, green and red rays which have passed through filter X will strike against the blue filter; but the latter will permit only the blue rays to pass through it and will intercept the green and red rays.

In the case of reproduction on ordinary film, the filter X is replaced by a suitable mechanical device which selectively masks the sectors corresponding to the colored rays which are to be intercepted, leaving open only the one sector that corresponds to the color to be obtained for the monochrome image.

The foregoing is also applicable in the case, say, of a bichrome film, in which instance there will be two filters. Two images will be obtained, one colored blue-green and the other red-orange.

I claim as my invention:

1. In the production of motion pictures in color, the steps of photographing the objects on a moving film which is goffered on its front face with a multitude of minute lenticular projections, while subjecting the light rays to the action of a polychrome filter so as to select the colors of the rays which reach the film and thereby form images in polychrome corresponding to the colors of the filter; and thereafter reproducing the polychrome images of the goffered film on a non-goffered film while the former is illuminated, and advancing the non-goffered film, for each image-space of the goffered film, a number of image-spaces equal to the number of color values of the polychrome filter, while masking said filter in such a way as to permit the light to pass through only one of its colored elements for each image on the non-goffered film, to obtain on said non-goffered film a plurality of separate monochrome images of the polychrome image corresponding in number to the number of color values of said polychrome image.

2. In the production of motion pictures in color, the steps of photographing the objects on a moving film which is goffered on its front face with a multitude of minute lenticular projections, while subjecting the light rays to the action of a trichrome filter so as to select the colors of the rays which reach the film and thereby form trichrome images corresponding to the filtered colors; and thereafter reproducing the trichrome images of the goffered film on a non-goffered film while the former is illuminated, and advancing the non-goffered film three image-spaces for each image-space of the goffered film, while masking the filter in such a way as to permit the light to pass through only one of its three colored elements for each image on the non-goffered film, to obtain on said non-goffered film three separate monochrome images of each trichrome image on the goffered film.

In testimony whereof I affix my signature.

PIERRE ABEL RICHARD.